United States Patent
Phillips

[15] 3,697,193
[45] Oct. 10, 1972

[54] FLUIDFOIL SECTION
[72] Inventor: Adrian Phillips, 14 Deer Park Cresent, Toronto, Ontario, Canada
[22] Filed: Dec. 10, 1970
[21] Appl. No.: 96,851

Related U.S. Application Data
[63] Continuation-in-part of Ser. No. 11,382, Feb. 16, 1970.

[52] U.S. Cl. .................416/223, 416/242, 416/243
[51] Int. Cl. ..............................................B63h 1/26
[58] Field of Search......416/223, 234, 237, 235, 242, 416/243

[56] References Cited

UNITED STATES PATENTS 1,923,325  8/1933  Ostria et al. ..............416/237
3,565,548  2/1971  Fowler et al. ..........416/242 X

FOREIGN PATENTS OR APPLICATIONS 1,183,498  1/1959  France......................416/223

Primary Examiner—Everette A. Powell, Jr.
Attorney—Arne I. Fors, Frank I. Piper and Brian Thorpe

[57] ABSTRACT

Airfoil sections having improved lift characteristics are described for use as propeller blades for air or marine craft for wings of aircraft for hydrofoil sections of hydrofoil vessels and for rotor blades in compressor stages of gas turbine engines. The improved section is characterized by a planar upper portion and convex face extending rearwardly of the leading edge for approximately one-third of the chord length of the section whereupon the face assumes a planar shape terminating at the trailing edge in either convergent or parallel relation with the upper surface of the section. The camber line of the trailing edge may be deflected in a direction away from the upper surface at an angle to the mean camber line of the section. Such improved airfoils provide lift by generation of a large positive pressure on the face of the section and only a small negative pressure on the upper surface of the section.

13 Claims, 6 Drawing Figures

INVENTOR.
ADRIAN PHILLIPS

FLUIDFOIL SECTION

This application is filed as a continuation-in-part to my co-pending U.S. Pat. application Ser. No. 11,382 filed Feb. 16, 1970 and entitled "Improved Propeller."

The present invention relates to an airfoil section having improved lift characteristics and it is contemplated that the subject airfoil may have application in the design of propulsive propellers for both air and marine craft, for wing sections of aircraft and hydrofoil vessels and for the rotor blades of gas turbine compressor stages.

It is, of course, known that all airfoil sections are designed on aerodynamic principles whereby the face or rearward surface of the section is usually flat and the upper or forward surface is convex providing the section with a positive camber. With reference to the use of such airfoil sections in propulsive propeller assemblies, it is known that, in operation, rotation of such a propeller in a fluid medium about a rotary hub upon which the propeller blades are mounted, causes them to move through the fluid at a pitch angle relative to the plane of rotation of the propeller. Such rotation results in the generation of a positive pressure on the flat face of the blade and a negative pressure over the upper surface of the blade, the latter negative pressure providing about two-thirds of the thrust obtained. Such propeller blade usually is evenly cambered between its leading and trailing edges in order to reduce peak levels of negative pressure over the upper convex surface.

A number of major problems can arise from the application of these principles and in particular, it is observed that the pressure drop induced over the upper surface of such propeller blades can promote turbulence (or cavitation as it is termed in marine useage), particularly at high blade speeds. Such turbulence, or cavitation, can and often does result in blade damage, undesirable vibration and the creation of excessive drag characteristics.

The "downwash" caused at the trailing edges of the blades by the convex contour of the blade upper surface results in an induced angle of attack of the blade relative to the direction of flow of the fluid medium. This induced angle of attack produces a drag component which acts in opposition to the torque provided to the propeller shaft to impede rotation of the propeller through the fluid medium.

The foregoing remarks are equally applicable to airfoil section rotor blades used in the compressor stages of a gas turbine engine, and also to aircraft wings and the foils of hydrofoil vessels. In all such sections, lift is provided, as aforesaid, through the creation of negative pressure over the upper convex surface of the section and a lesser positive pressure on the section face. Although the resultant lift is caused by the acceleration of the fluid medium in a downward direction, a pressure drop is created over the section of the surface causing the fluid stream to be drawn primarily in an upward direction prior to its being persuaded to pursue a downward course by the shape of the airfoil section.

This method of producing lift has a number of inherent problems, the primary ones being a. the ability of the convex upper surface of the section to persuade the fluid flow to follow its upper contour under laminar flow conditions, or even under turbulent flow conditions when the rotation of acceleration of the fluid about the upper surface causes flow separation. This condition, when aggravated, causes a complete break-down of the fluid flow producing a stall condition at which point lift rapidly diminishes.

b. the rotational velocity around the upper surface of the section causes the "downwash" at the trailing edge which, in turn, results in an induced angle of attack and commensurate induced drag component. In addition, trailing edge vortices occur as the upper and lower flow streams (at different pressures and velocities) meet immediately rearward of the trailing edge.

c. the fact that the incident fluid stream is sucked upwards towards the low pressure upper surface prior to being induced to assume a downward direction at the trailing edge, implies that work has been done to "raise" the fluid stream and must be deducted from the work done to direct the fluid stream in a downward direction in order to arrive at the true resultant lift force.

d. a conventional airfoil section is basically unstable. As the majority of the lift is produced by the creation of the negative pressure over the convex upper surface towards the leading edge, any increase in lift tends to accentuate the moment already trying to raise the leading edge, and, if unchecked, this would result in a larger angle of attack, greater lift and the eventual onset of a stall condition.

It is a broad object of the present invention to provide an improved airfoil section having improved lift characteristics which will produce the major portion of thrust from positive pressure exerted by a fluid medium on its face instead of utilizing negative pressure on its upper surface.

It is another object of the invention to provide such an airfoil section providing maximum fluid displacement in a restricted zone in proximity to, and coextensive with, the leading edge of the section, thereby permitting increase of the area of planar surface desirable for streamlining fluid flow in order to reduce turbulence due to trailing edge vortices normally inherent in conventional airfoil section design. This substantial elimination of trailing edge vortices is effective in minimizing the induced angle of attack and consequently minimizing induced drag and the occurence of a stall condition.

In accordance with the invention, there is provided an airfoil section having a leading edge and a trailing edge and an upper surface and a face, said face of the section having a convex shape commencing at the leading edge and terminating intermediate the leading edge and trailing edge, whereupon the face assumes a planar shape extending over at least part of said face forward of the trailing edge; said upper surface of the section having a substantially planar shape between the leading edge and the trailing edge, whereby the major portion of lift provided by the section moving through a fluid medium is produced by positive pressure exerted on said face of the section by said medium.

In one form of said airfoil section according to the invention, the planar shape of said face extends continuously from the said termination of the convex shape to the trailing edge of the section, whilst in another form, said planar shape of said face terminates intermediate the leading and trailing edges of the section and said face has a generally concave shape extending from said termination of said planar shape to the trailing edge of the section. In addition, in either of the two forms aforementioned, the camber line of the trailing edge of the section may be deflected in a direction away from the upper surface at an angle to the mean camber line of the section.

It is believed that the aforementioned design of airfoil section gives rise to the following advantages.

a. By creating a relatively "flat" upper surface of the section, the role of the upper surface becomes of significantly less importance than the face with respect to the lift generating ability of the section. This substantially reduces the presence of any "rotational acceleration" of the fluid medium over the upper surface.

b. "Down-wash" is reduced to a minimum by virtue of the upper surface being "flat" and the rotational acceleration of the fluid stream across the upper surface being substantially reduced. In addition, to attract the incident fluid stream to the face of the leading edge, as opposed to the upper surface, said face has a convex shape commencing at the leading edge, thereby not only causing a localized drop in pressure to attract the incident flow stream, but also reducing the pressure drag at the leading edge. Such effects create fluid pressure on the face of the section substantially at and rearward of mid-chord where the face has a planar shape in accordance with the invention, thereby producing increased lift.

c. As the majority of lift forces generated are on the center and rearward portions of the face of the section, the resultant lift force is rearward of the center of gravity of the section, thereby insuring stability. If excessive lift is experienced, the resulting moment acts to return the section to an attitude of balanced equilibrium.

Other feature of the invention will become apparent from the hereinafter following description of the parts, principles and elements thereof given herein solely by way of example with reference to the accompanying drawings, wherein like reference numerals refer to like parts throughout the several views and wherein.

Figure 3:
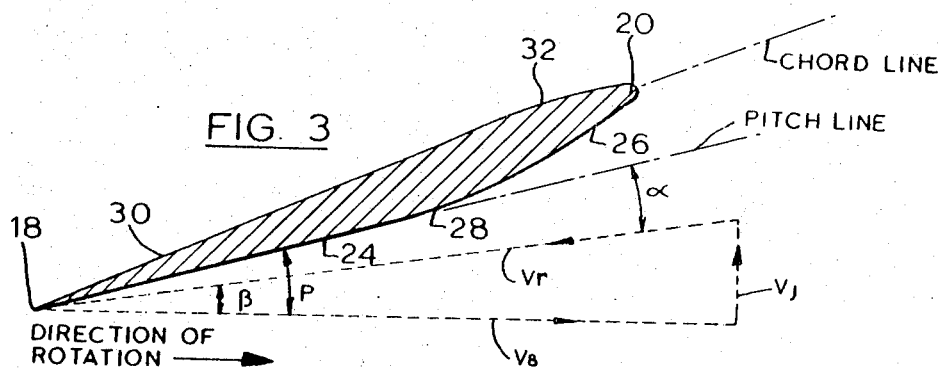
FIG. 3 is a transverse section of a propeller blade constructed in accordance with the present invention.
Figure 5:
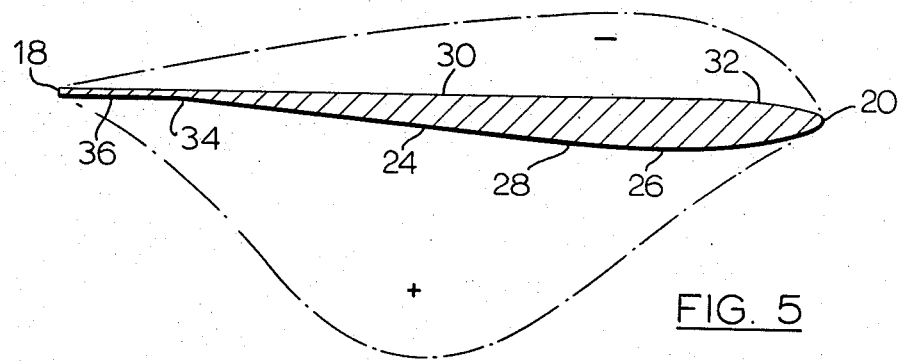
Figure 6:
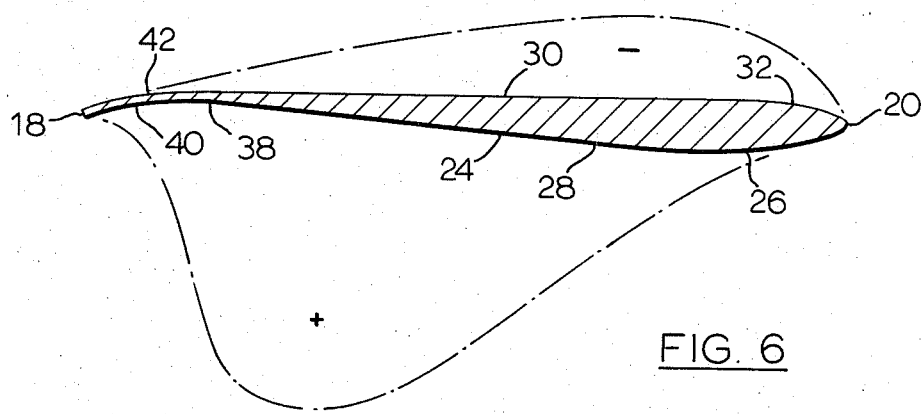

FIG. 5 is an enlarged transverse section of an airfoil constructed in accordance with the invention, similar to the section utilized in the propeller blade of FIG. 3 showing a modified face of the section at the trailing edge, and also illustrating in graphical form the pressure distribution about the section as it is moved through a fluid medium; and FIG. 6 is a transverse section of a modified form of the airfoil shown in FIG. 5, having a concave section forward of its trailing edge.

FIGS. 1 to 4 of the drawings relate to utilization of the subject airfoil section in the propulsive propeller for a maring craft, although it should be understood that the following principales are generally applicable to such a design of airfoil section utilized also in the propulsive propellers of aircraft and for wing sections of aircraft, the foils of hydrofoil vessels and for the rotor blades of the compressor stages in a gas turbine engine.

Figure 1:
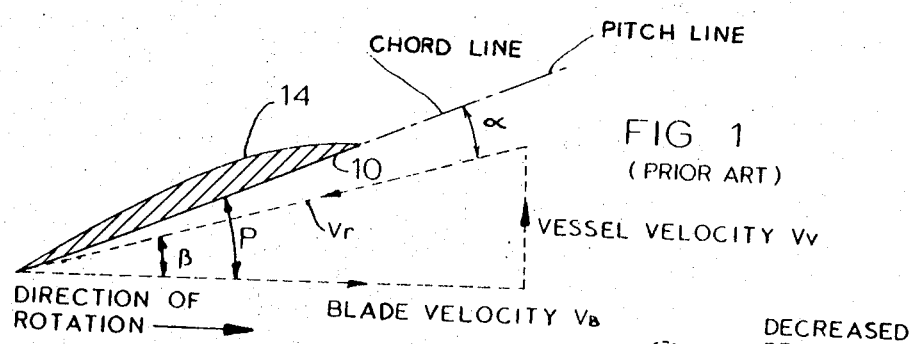
FIG. 1 is a transverse section of a conventional airfoil section, as utilized in a propulsive propeller for air or marine craft.

With reference to FIG. 1 of the drawing, a conventional marine propeller blade is arranged at a pitch angle P relative to the direction of rotation of the blade measured from the blade pitch line, which is coincident with the chord line formed by the rearward surface 10 of the blade. It will be understood that the vectors indicated relate blade velocity $V_b$, in the direction of rotation of the propeller, to the vessel velocity $V_v$, subtending an angle $\beta$ and hypotenuse $V_r$ for relative water velocity. The angle $\alpha$ indicates the blade angle of attack.

Figure 2:
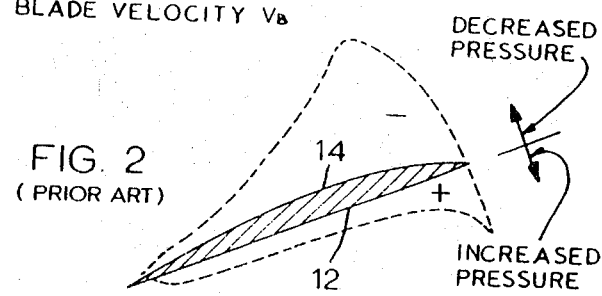
FIG. 2 is a graphical illustration of pressure distribution about the blade shown in FIG. 1, as the blade is pivoted through a fluid medium about a propeller hub.

FIG. 2 shows the sectional area of decreased pressure coextensive with the convex upper surface 14 of the blade illustrated in FIG. 1. Approximately two-thirds of the total lift affecting the blade is derived from the said negative pressure resulting in undesirable characteristics, such as cavitation and turbulence inherent in conventional blade design.

FIG. 3 illustrates a blade section in accordance with the present invention in which the chord line indicated connects the blade trailing edge 18 to the blade leading edge 20. The pitch line coincides with the flat portion 24 of planar shape on the face of the blade aft of the convex shape portion 26, which commences at the leading edge 20 and terminates at a longitudinal line designated by numeral 28. The convex shape portion 26 is shown to extend rearward from the leading edge approximately one-third of the chord length, while, although the length of said portion 26 can be varied to some small degree, it is preferable to maintain a relatively long planar portion 24 to minimize turbulence and trailing edge vortices. In this embodiment, said planar shape portion 24 extends continuously rearwardly of the blade face from the termination 28 of the convex shape portion 26 to the trailing edge 18 of the blade. The radius of curvature of the convex portion 26 can be varied for particular propeller applications depending primarily on the thickness ratio of the blade section.

The upper surface of the blade is substantially planar between the leading edge 20 and trailing edge 18 having a flat portion 30 and a slightly convex portion 32 extending rearwardly from the leading edge 20 on the upper surface. The upper surface convex portion 32 is joined to the face convex portion 26 by a rounded leading edge 20.

It will be understood that the upper surface of the section can be continuously planar with no convex portions as designated by numeral 32, and in any event, such convex portion 32 will only extend rearwardly from the leading edge 20 for approximately one-sixth of the chord length between the leading edge and trailing edge of the blade.

Figure 4:
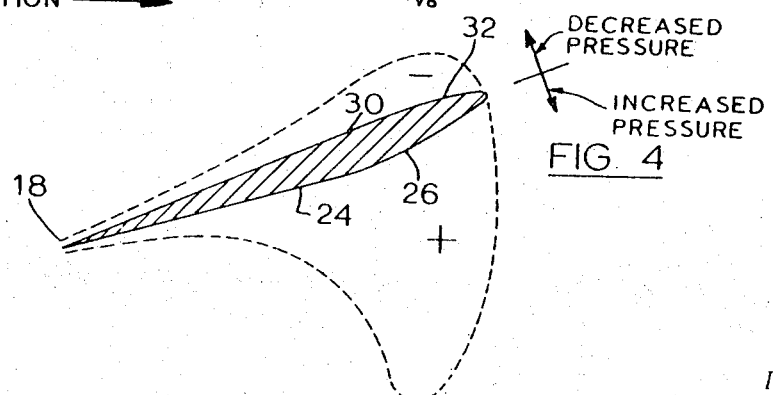
FIG. 4 is a graphical illustration of pressure distribution about the blade shown in FIG. 3, as the blade is pivoted through a fluid medium about a propeller hub.

FIG. 4 illustrates the relatively small area of decreased pressure on the upper surface of the blade and the relatively large area of increased pressure coextensive with the convex and planar shaped portions 26–24 on the face of the blade. As the majority of thrust is provided by this increased pressure, i.e., positive pressure, cavitation and turbulence due to negative pressure is minimized. The flat portions 24 and 30 on the face and upper surface of the blade respectively extend to the trailing edge 18 in convergent relation for permitting the negative and positive pressures to return to static pressure in a uniform manner from the trailing edge 18 of the blade, thereby minimizing turbulence and trailing edge vortices. To assist in establishing this uniform return to static pressure, the upper surface and face of the blade "squared off" at the trailing edge 18 as distinct from the pointed configuration shown in FIGS. 3 and 4.

FIG. 5 of the drawings illustrates an airfoil section in accordance with the invention of a form similar to that shown in FIGS. 3 and 4, but wherein the radius of curvature of the convex portion 26 on the face is considerably greater. Such a section may also find application in the design of propulsive propellers for both air and marine craft, for wing sections for aircraft, for hydrofoil sections for hydrofoil vessels and for the rotor blades of the compressor stages of gas turbine engines.

The airfoil section shown in FIG. 5 is provided with the convex shape portion 26 on its face extending rearwardly from the leading edge 20 and terminating at position 28 approximately one-third of the chord length aft of the leading edge, whereupon the face assumes the planar shape 24 extending towards the trailing edge 18. Said planar shape 24 extends in a direction convergent to the upper surface for approximately one-half the chord length to a position indicated at 34 whereupon it assumes a concave shape and a further planar shape 36 parallel to the upper surface. This planar shape portion 36 thus occupies approximately one-sixth of said chord length. The upper surface of the section may be slightly convex, as shown at 32, extending rearwardly on the upper surface aft of the leading edge 20 for a distance approximately one-sixth of the chord length, and thereafter assuming the planar shape 30 extending continuously to the trailing edge 18.

In this design, the majority of thrust is again provided by increased pressure, i.e. positive pressure, on the face of the section, and due to the difference in radius of curvature of the convex portion 26 of the section face, as compared with that shown in FIG. 3, the area of increased pressure is shifted further rearward of the section to a position further rearward of the center of gravity thereof, thereby ensuring greater stability to the section.

Such parallel relation between the upper surface and face for a distance approximately one-sixth of the chord length forward of the trailing edge 18 permits the negative and positive pressures to return to static pressure in a uniform manner from the trailing edge 18 of the section.

Another form of the subject airfoil section is shown in FIG. 6 of the drawings wherein the camber line of the trailing edge on both the upper surface and the face is deflected away from the upper surface at an angle to the mean camber line of the section. In this embodiment, it is preferred that the convex portion 26 of the face extend rearward of the leading edge for approximately one-third of the chord length whereupon it assumes the planar shape 24 extending for a further one-half of the chord length distance. This planar shape portion 24 then terminates at the position indicated by reference numeral 38 whereupon the face assumes a concave configuration in a direction towards the trailing edge 18. Similarly, the planar shape of the upper surface terminates at a position forward of the trailing edge 18 of the section and is curved to correspond to the curvature of the blade face. Thus, the upper surface of the section assumes a convex shape 42 in concentric relation with the concave shape 40 of the face whereby the camber line of the trailing edge of the section on both said upper surface and face is deflected in a direction away from the upper surface at an angle to the mean camber line of the section. From the proportions given hereinbefore, it will be appreciated that such camber line deflection extends forwardly of the trailing edge 18 for a distance of approximately one-sixth of the chord length and the concentric relation of the curvature between the convex shape 42 of the upper surface and the concave shape 40 of the face will again permit the negative and positive pressures to return to static pressure in a uniform manner from the trailing edge 18 of the section.

In this form of the invention, a large area of increased positive pressure is again produced on the section face and due to the provisions of the camber line deflection, the center of such pressure is moved even further rearward relative to the center of gravity of the section as compared with the area of pressure indicated in the FIG. 5 embodiment. It will, of course, be appreciated that variation in the rate of camber adjacent the trailing edge 18 will vary the position and area of the increased pressure region on the face of the section; increased rate of camber generally shifting the center of positive pressure further rearward of the center of gravity of the section for insuring greater stability thereto.

What I claim as new and desire to protect by Letters Patent of the United States is:

1. A fluidfoil section having a leading edge and a trailing edge and an upper surface and a face,
    said face being the high pressure working surface,
    said face of said section having a convex shape commencing at the leading edge and terminating intermediate the leading edge and trailing edge whereupon the face assumes a planar shape extending over at least part of said face rearward of said termination, said upper surface of the section having a substantially planar shape extending from the leading edge to adjacent the trailing edge whereby the major portion of lift provided by the section moving through a fluid medium is produced by positive pressure exerted on said face of the section by said medium.

2. A fluidfoil section as claimed in claim 1 wherein:
    said planar shape of both said upper surface and face extends to the trailing edge of the section, said upper surface and face being convergent towards one another at the trailing edge providing a wedge-shaped cross-sectional configuration thereto.

3. A fluidfoil section as claimed in claim 1 wherein:
    said planar shape of the upper surface extends to the trailing edge of the section,
    said planar edge of the face extends rearwardly from said termination of said convex shape to a position forward of the trailing edge in a plane convergent towards the upper surface whereupon said face assumes a further planar shape parallel to said upper surface at the trailing edge.

4. A fluidfoil section as claimed in claim 3 wherein:
said face assumes a concave shape intermediate those said planar shapes of the face which are respectively convergent towards and parallel to said upper surface.

5. A fluidfoil section as claimed in claim 1 wherein:
the camber line of the trailing edge of said section on both said upper surface and face thereof is deflected in a direction away from the upper surface at an angle to the mean camber line of the section.

6. A fluidfoil section as claimed in claim 5 wherein:
said face has a said convex shape for approximately one-third of the chord length between the leading edge and trailing edge thereof and,
said camber line deflection extends forward of said trailing edge for approximately one-sixth of the said chord length.

7. A fluidfoil section as claimed in claim 2 wherein:
said face has a said convex shape for approximately one-third of the chord length between the leading edge and trailing edge thereof and,
said upper surface of the section has a convex shape extending from the leading edge for approximately one-sixth of said chord length.

8. A fluidfoil section as claimed in claim 3 wherein:
said face has a said convex shape for approximately one-third of the chord length between the leading edge and trailing edge thereof, said planar shape extends for approximately one-half of said chord length after the termination of said convex shape and,
said further planar shape extends approximately one-sixth of said chord length in said parallel relation with said upper surface.

9. A fluidfoil section as claimed in claim 8 wherein:
said upper surface of the section has a convex shape extending from the leading edge for approximately one-sixth of said chord length.

10. A fluidfoil section as claimed in claim 1 wherein:
said planar shape of both the upper surface and face terminate at a position forward of the trailing edge and,
said upper surface and face are curved aft of said position towards the trailing edge providing a convex shape to the upper surface and a concentric concave shape to the face whereby the camber line of the trailing edge on both said upper surface and face is deflected in a direction away from the upper surface at an angle to the mean camber line of the section.

11. A fluidfoil section as claimed in claim 10 wherein:
said camber line deflection extends forward of said trailing edge for approximately one-sixth of the chord length between the leading edge and trailing edge thereof.

12. A fluidfoil section as claimed in claim 11 wherein:
said face has a said convex shape for approximately one-third of the chord length between the leading edge and the trailing edge thereof and,
said planar shape extends for approximately one-half of said chord length aft of the termination of said convex shape.

13. A fluidfoil section as claimed in claim 12 wherein:
said upper surface of the section has a convex shape extending from the leading edge for approximately one-sixth of said chord length.

* * * * *